US012119015B2

(12) United States Patent
Zheng et al.

(10) Patent No.: US 12,119,015 B2
(45) Date of Patent: Oct. 15, 2024

(54) SYSTEMS, METHODS, APPARATUS, AND STORAGE MEDIUM FOR PROCESSING A SIGNAL

(71) Applicant: SHENZHEN SHOKZ CO., LTD., Guangdong (CN)

(72) Inventors: Jinbo Zheng, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 17/649,362

(22) Filed: Jan. 30, 2022

(65) Prior Publication Data

US 2022/0301574 A1 Sep. 22, 2022

Related U.S. Application Data

(63) Continuation of application No. PCT/CN2021/081927, filed on Mar. 19, 2021.

(51) Int. Cl.
*G10L 21/0216* (2013.01)
*G10L 25/18* (2013.01)

(52) U.S. Cl.
CPC .......... *G10L 21/0216* (2013.01); *G10L 25/18* (2013.01)

(58) Field of Classification Search
CPC ............................ G10L 21/0216; G10L 25/18
USPC ........................................................... 704/233
See application file for complete search history.

(56) References Cited

U.S. PATENT DOCUMENTS 8,489,026 B2 7/2013 Terlizzi
9,363,596 B2 6/2016 Dusan et al.
9,516,159 B2 12/2016 Theverapperuma et al.
10,090,001 B2 10/2018 Theverapperuma et al.
(Continued)

FOREIGN PATENT DOCUMENTS

CN 102411936 A 4/2012
CN 103208291 A 7/2013
(Continued)

OTHER PUBLICATIONS

International Search Report in PCT/CN2021/081927 mailed on Dec. 15, 2021, 10 pages.
(Continued)

*Primary Examiner* — Nicole A K Schmieder
(74) *Attorney, Agent, or Firm* — Metis IP LLC

(57) ABSTRACT

The present disclosure provides systems and methods for processing a signal. The system for processing a signal may include at least one microphone and at least one vibration sensor. The at least one microphone may be configured to collect a sound signal, and the sound signal may include at least one of user voice and environmental noise. The at least one vibration sensor may be configured to collect a vibration signal, and the vibration signal may include at least one of the user voice and the environmental noise. The system for processing a signal may also comprise a processor. The processor may be configured to determine a relationship between a noise component in the sound signal and a noise component in the vibration signal, and obtain a target vibration signal by performing, based at least on the relationship, noise reduction processing on the vibration signal.

15 Claims, 12 Drawing Sheets

300

(56) References Cited

U.S. PATENT DOCUMENTS

| | | | | |
|---|---|---|---|---|
| 2006/0178880 | A1* | 8/2006 | Zhang | G10L 21/0208 704/233 |
| 2010/0022269 | A1 | 1/2010 | Terlizzi | |
| 2014/0093093 | A1 | 4/2014 | Dusan et al. | |
| 2014/0363020 | A1* | 12/2014 | Endo | H04R 3/04 381/98 |
| 2017/0263267 | A1 | 9/2017 | Dusan et al. | |
| 2017/0365249 | A1 | 12/2017 | Dusan et al. | |
| 2018/0068671 | A1* | 3/2018 | Fawaz | G10L 15/30 |
| 2018/0146197 | A1 | 5/2018 | Yi et al. | |
| 2021/0241782 | A1* | 8/2021 | Ganeshkumar | G10L 21/0232 |

FOREIGN PATENT DOCUMENTS

| | | | |
|---|---|---|---|
| CN | 106686494 | A | 5/2017 |
| CN | 109346075 | A | 2/2019 |
| WO | 2020060206 | A1 | 3/2020 |

OTHER PUBLICATIONS

Written Opinion in PCT/CN2021/081927 mailed on Dec. 15, 2021, 8 pages.

* cited by examiner

SYSTEMS, METHODS, APPARATUS, AND STORAGE MEDIUM FOR PROCESSING A SIGNAL

CROSS-REFERENCE TO RELATED APPLICATION

This application is a Continuation of International Application No. PCT/CN2021/081927, filed on Mar. 19, 2021, the contents of each of which are hereby incorporated by reference in its entirety.

TECHNICAL FIELD

The present disclosure relates to the field of signal processing, and in particular, to systems, methods, apparatus, and storage medium for processing a vibration signal.

BACKGROUND

When a person is talking, vibrations in the bones and skins are generated at the same time. The vibrations may be picked up by a vibration sensor and converted into corresponding electrical signals or other types of signals. Since general environmental noise can hardly cause vibrations in the bones or skins, compared with an air conduction microphone, the vibration sensor may record a cleaner voice signal and reduce the interference of the environmental noise.

However, when the external environmental noise is loud, the noise may drive the bones, skins, or the vibration sensor to vibrate, thereby causing interference to a voice signal received by the vibration sensor. Therefore, it is desirable to provide a method for processing a voice signal collected by a vibration sensor to reduce the interference caused by external noise to the vibration sensor.

SUMMARY

One aspect of the embodiments of the present disclosure provides a system for processing a signal. The system may comprise at least one microphone configured to collect a sound signal, and the sound signal may include at least one of user voice and environmental noise. The system may also comprise at least one vibration sensor configured to collect a vibration signal, and the vibration signal may include at least one of the user voice and the environmental noise. The system may also comprise a processor configured to determine a relationship between a noise component in the sound signal and a noise component in the vibration signal, and obtain a target vibration signal by performing, based at least on the relationship, noise reduction processing on the vibration signal.

Another aspect of the embodiments of the present disclosure provides a method for processing a signal. The method may comprise collecting a sound signal by at least one microphone, and the sound signal may include at least one of user voice and environmental noise. The method may also comprise collecting a vibration signal by at least one vibration sensor, and the vibration signal may include at least one of the user voice and the environmental noise. The method may also comprise determining a relationship between a noise component in the sound signal and a noise component in the vibration signal, and obtaining a target vibration signal by performing, at least based on the relationship, noise reduction processing on the vibration signal.

Another aspect of the embodiments of the present disclosure provides an electronic device comprising at least one storage device configured to store at least one set of instructions, and at least one processor configured to execute at least part of the at least one set of instructions to perform a method mentioned above.

Another aspect of the embodiments of the present disclosure provides a non-transitory computer readable medium comprising at least one set of instructions, wherein when read by a computing device, the at least one set of instructions may cause the computing device to perform a method mentioned above.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, and wherein.

DETAILED DESCRIPTION

Figure 1:
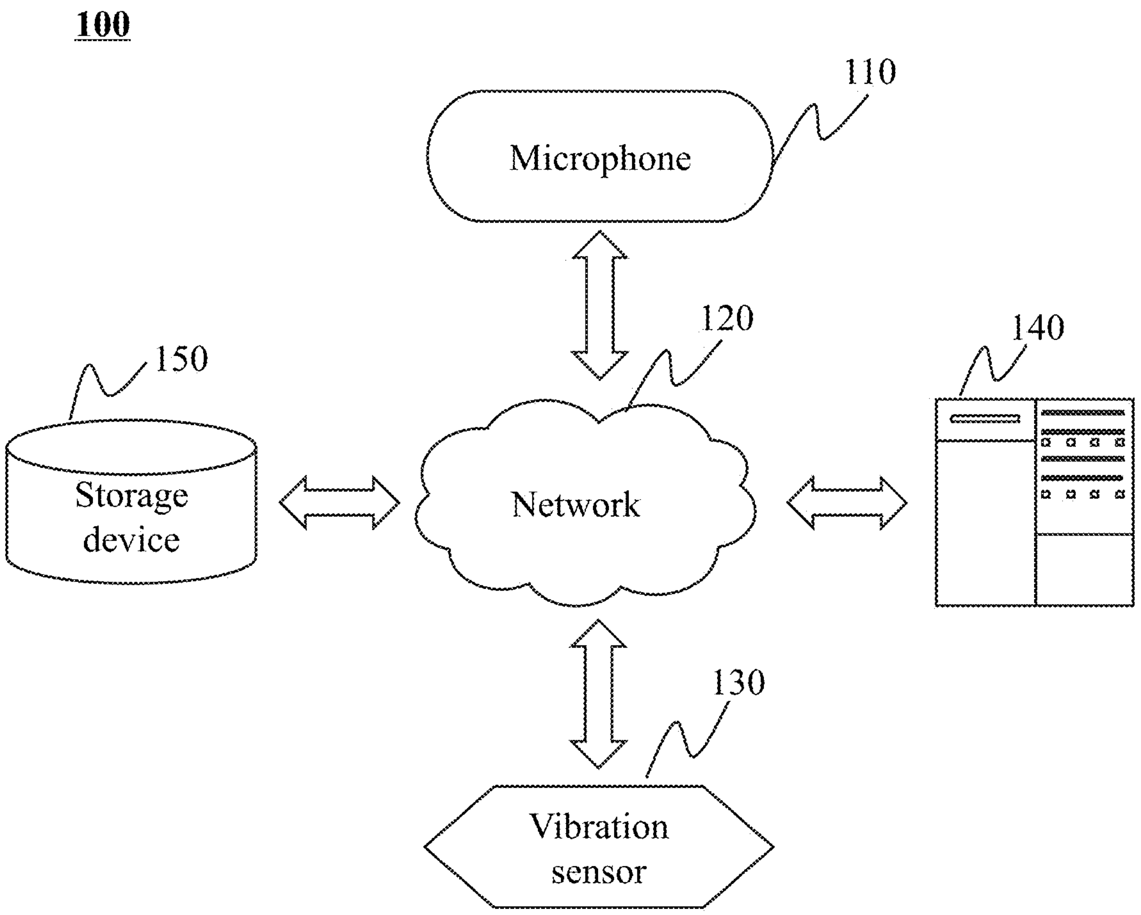
FIG. 1 is a schematic diagram illustrating an application scenario of a system for processing a signal according to some embodiments of the present disclosure.

In the following detailed description, numerous specific details are set forth by way of examples in order to provide a thorough understanding of the relevant disclosure. Obviously, drawings described below are only some examples or embodiments of the present disclosure. Those skilled in the art, without further creative efforts, may apply the present disclosure to other similar scenarios according to these drawings. Unless obviously obtained from the context or the context illustrates otherwise, the same numeral in the drawings refers to the same structure or operation.

It will be understood that the terms "system," "engine," "unit," "module," and/or "block" used herein are one method to distinguish different components, elements, parts, sections, or assemblies of different levels in ascending order. However, the terms may be displaced by other expressions if they may achieve the same purpose.

As used in the disclosure and the appended claims, the singular forms "a," "an," and "the" include plural referents unless the content clearly dictates otherwise. In general, the terms "comprise" and "include" merely prompt to include steps and elements that have been clearly identified, and these steps and elements do not constitute an exclusive listing. The methods or devices may also include other steps or elements. The terms "noise relationship" and "relationship" can be used interchangeably. For example, the expression "a noise relationship between a sound signal and a vibration signal" is equivalent to the expression "a relationship between a noise component in a sound signal and a noise component in a vibration signal".

The flowcharts used in the present disclosure illustrate operations that systems implement according to some embodiments of the present disclosure. It is to be expressly understood, the operations of the flowcharts may be implemented not in order. Conversely, the operations may be implemented in an inverted order, or simultaneously. Moreover, one or more other operations may be added to the flowcharts.

A vibration sensor may detect the vibration of the skin or the skeleton when people are talking, and convert the vibration into an electrical signal. However, the vibration sensor may be accompanied by some noise signals while collecting the user voice. For example, environmental noise, noise generated by chewing, walking, or the like, or noise generated by friction between the skin and the vibration sensor. Therefore, it may be desirable to reduce the noise of the signal collected by the vibration sensor to reduce the interference caused by the noise signal.

To solve the problems mentioned above, embodiments of the present disclosure provide systems and methods for processing a signal. The relationship between a vibration signal and a noise component in a sound signal may be determined by combining the vibration signal collected by the vibration sensor with the sound signal collected by a microphone. The noise of the vibration signal may be reduced based on the relationship and the noise component in the sound signal, thereby reducing the interference caused by the noise.

The systems and methods for processing a signal according to some embodiments of the present disclosure may be described in detail below with reference to the drawings.

FIG. 1 is a schematic diagram illustrating an application scenario of a system for processing a signal according to some embodiments of the present disclosure.

As shown in FIG. 1, in some embodiments, a system 100 for processing a signal may include a microphone 110, a network 120, a vibration sensor 130, a processor 140, and a storage device 150. In some embodiments, each of the components in the system 100 may be connected to each other through the network 120. For example, the microphone 110 and the processor 140 may be connected or communicated through the network 120, the microphone 110 and the storage device 150 may be connected or communicated through the network 120, and the storage device 150 and the processor 140 may be connected or communicated through the network 120. In some embodiments, the network 120 may not be necessary. For example, the microphone 110, the vibration sensor 130, the processor 140, and the storage device 150 may be integrated into an electronic device as different components. The electronic device may include a wearable device such as earphones, glasses, a smart helmet, or the like. Different parts of the electronic device may be connected by metal wires to transmit data.

In some embodiments, the system 100 for processing a signal may include one or more microphones 110 and one or more vibration sensors 130. The one or more microphones 110 may be used to collect user voice and environmental noise, and generate a sound signal. The user voice and the environmental noise may be transmitted to the microphone 110 in an air conduction manner. The one or more vibration sensors 130 may be in contact with the body of the user. For example, the one or more vibration sensors 130 may contact the face or the neck of the user, and generate a vibration signal by receiving the physical vibration of the contact part caused by the user talking or the environmental noise. In some embodiments, a plurality of microphones 110 may be arranged in an array to form a microphone array. The microphone array may recognize an air conduction sound from a specific direction, for example, the sound from the mouth of the user, the sound from other directions other than the mouth of the user, or the like.

The network 120 may include any suitable network capable of facilitating the exchange of information and/or data of the system 100. In some embodiments, at least one component of the system 100 (e.g., the microphone 110, the vibration sensor 130, the processor 140, and the storage device 150) may exchange information and/or data with at least one other component of the system 100 through the network 120. For example, the processor 140 may obtain a signal from the microphone 110 or the vibration sensor 130 through the network 120. As another example, the processor 140 may obtain a preset processing instruction from the storage device 150 through the network 120. The network 120 may be or include a public network (e.g., the Internet), a private network (e.g., a local area network (LAN)), a wired network, a wireless network (e.g., an 802.11 network, a Wi-Fi network), a frame relay network, a virtual private network (VPN), a satellite network, a telephone network, a router, a hub, a switch, a server computer, and/or any combination thereof. For example, the network 120 may include a wired network, a wireless network, an optical fiber network, a telecommunications network, an intranet, a wireless local area network (WLAN), a metropolitan area network (MAN), a public switched telephone network (PSTN), a Bluetooth network, a ZigBee™ network, a Near Field Communication (NFC) network, or the like, or any combination thereof. In some embodiments, the network 120 may include at least one network access point. For example, the network 120 may include wired and/or wireless network access points, such as a base station and/or an Internet exchange point, and at least one component of the system 100 may be connected to the network 120 through the access point to exchange data and/or information. In some embodiments, the microphone 110 and the vibration sensor 130 may be integrated into an electronic device (e.g., earphones). The electronic device may communicate with other terminal devices through the network 120. For example, the electronic device may send the electrical signals generated by the microphone 110 and the vibration sensor 130 to a user terminal (e.g., a mobile phone) through the network 120, and the user terminal may process the received signal, and send the processed signal back to the electronic device through the network 120. The manner mentioned above may reduce the burden of the electronic device on processing a signal, thereby reducing the sizes of the signal processor (if any) and a battery of the electronic device effectively.

The processor 140 may process data and/or instructions obtained from the microphone 110, the vibration sensor 130, the storage device 150, or other components of the system 100. For example, the processor 140 may obtain a sound signal from the microphone 110 and a vibration signal from the vibration sensor 130, and process the sound signal and the vibration signal to determine the relationship between the noise component in the sound signal and the noise component in the vibration signal. As another example, the processor 140 may obtain pre-stored instructions from the storage device 150 and execute the instructions to perform the method for processing a signal described below. Merely as an example, the processor may include a central processing unit (CPU), an application-specific integrated circuit (ASIC), an application-specific instruction processor (ASIP), a graphics processing unit (GPU), a physical processor (PPU), a digital signal processor (DSP), a Field Programmable Gate Array (FPGA), an Editable Logic Circuit (PLD), a controller, a Microcontroller Unit, a Reduced Instruction Set Computer (RISC), a microprocessor, or the like, or any combination thereof.

In some embodiments, the processor 140 may be local or remote. For example, the processor 140, the microphone 110, and the vibration sensor 130 may be integrated into an electronic device, or distributed in different electronic devices. In some embodiments, the processor 140 may be implemented on a cloud platform. For example, the cloud platform may include a private cloud, a public cloud, a hybrid cloud, a community cloud, a distributed cloud, an inter-cloud, a multi-cloud, or the like, or any combination thereof.

The storage device 150 may store data, instructions, and/or any other information. In some embodiments, the storage device 150 may store the sound signal collected by the microphone 110 and/or the vibration signal collected by the vibration sensor 130. In some embodiments, the storage device 150 may store data and/or instructions executed or used by the processor 140 to complete the exemplary methods described in the present disclosure. In some embodiments, the storage device 150 may include a mass storage device, a removable memory, a volatile read-write memory, a read-only memory (ROM), or the like, or any combination thereof. An exemplary mass storage device may include a magnetic disk, an optical disk, a solid-state disk, or the like. An exemplary removable memory may include a flash drive, a floppy disk, an optical disk, a memory card, a compact disk, a magnetic tape, or the like. An exemplary volatile read-write memory may include a random access memory (RAM). In some embodiments, the storage device 150 may be implemented on a cloud platform.

In some embodiments, the storage device 150 may be connected to the network 120 to communicate with at least one other component (e.g., the processor 140) of the system 100. The at least one component of the system 100 may access data or instructions stored in the storage device 150 or write data to the storage device 150 through the network 120. In some embodiments, the storage device 150 may be part of the processor 140.

It should be noted that the above descriptions of the system 100 for processing a signal and each component of the system 100 are merely provided for the purposes of illustration, and not intended to limit the scope of the present disclosure. For persons having ordinary skills in the art, a combination of each component may be made arbitrarily, or a sub-system connecting with other modules may be formed under the teachings of the present disclosure. In some embodiments, each component may share the storage device 150. In some embodiments, each component may also have a storage module, respectively. Such deformations may be within the scope of the present disclosure.

In some embodiments, the system 100 for processing a signal may be applied to an electronic device or other devices, for example, a wearable electronic device such as earphones, glasses, a smart helmet, or the like, to reduce noise interference to a user voice signal collected by the vibration sensor. It should be noted that the apparatus or the device mentioned above is only an example, and the system 100 for processing a signal according to some embodiments of the present disclosure may be applied to, but is not limited to, the apparatus or the electronic device mentioned above.

Figure 2:
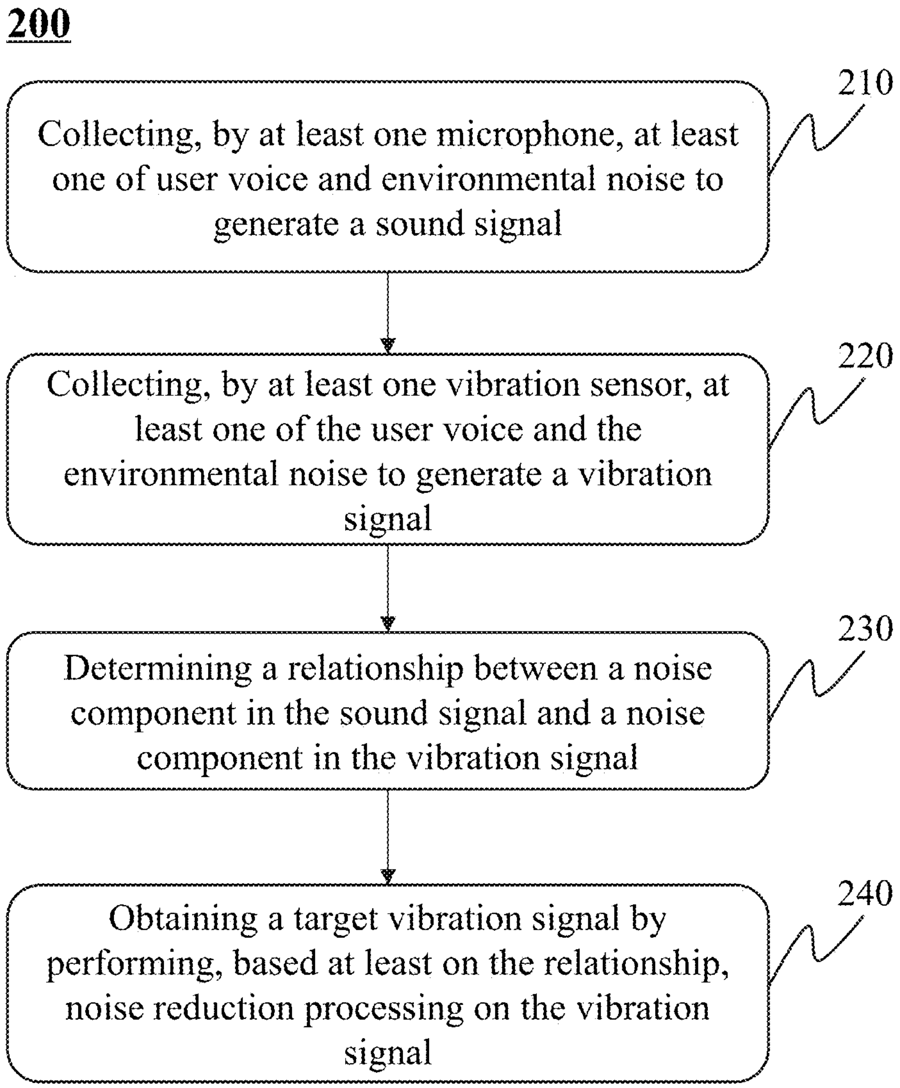
FIG. 2 is a flow diagram of a method for processing a signal according to some embodiments of the present disclosure.

FIG. 2 is a flow diagram of a method for processing a signal according to some embodiments of the present disclosure. In some embodiments, a process 200 may be achieved by using one or more additional operations not described below, and/or completed not through one or more operations described below. In addition, the order of operations shown in FIG. 2 is not limited herein. In some embodiments, the process 200 may be applied to the system 100 for processing a signal as shown in FIG. 1. In some embodiments, the process 200 may be executed by the processor 140.

As shown in FIG. 2, in some embodiments, the process 200 may include the following operations:

In operation 210, a sound signal may be generated by collecting at least one of user voice and environmental noise through at least one microphone.

In some embodiments, the user voice and/or the environmental noise may be collected by one or more microphones. The user voice may refer to the sound generated by the user talking or an utterance. For example, the sound generated by a normal speaking of the user, as well as laughter, crying, shouting, or the like. The environmental noise may refer to a sound other than the user voice, for example, the sound of wind, rain, car, the roar of machinery, and other sounds generated by other objects. The user may refer to a person wearing the at least one microphone. When the user is talking, the one or more microphones may collect the user voice and the environmental noise simultaneously. The generated sound signal may include both a user voice component corresponding to the user voice and a noise component corresponding to the environmental noise. When the user is not talking, the one or more microphones may only collect the environmental noise, and the generated sound signal may only include the noise component corresponding to the environmental noise. In some embodiments, the one or more microphones may refer to the air conduction microphones. In some embodiments, the one or more microphones may include a single microphone or a microphone array. Different microphones in the microphone array may be at different distances from the mouth of the user.

In some embodiments, the processor 140 may obtain sound signals generated by the one or more microphones. The sound signal may be an electrical signal or other forms of signals.

In operation 220, a vibration signal may be generated by collecting at least one of the user voice and the environmental noise through at least one vibration sensor.

In some embodiments, while the one or more microphones are collecting the user voice and/or the environmental noise, the one or more vibration sensors may collect the user voice and/or the vibration caused by the environmental noise. The sound signal generated by the microphone and the vibration signal generated by the vibration sensor may correspond to the same sound content. In some embodiments, the one or more vibration sensors may be in contact with the body of the user, such as the face, the neck, or the like, to collect the vibration generated by the skins or the bones of the user when the user generates a sound. When there is a plurality of vibration sensors, the plurality of vibration sensors may be arranged at different parts of the body of the user, which may collect the vibrations of different parts of the user and generate the vibration signals, respectively. For example, the vibration signal may be an electrical signal corresponding to the vibration sensor with the strongest signal strength among the plurality of vibration sensors. As another example, the vibration signal may be formed by combining the electrical signals collected by each of the plurality of vibration sensors.

In some embodiments, the processor 140 may obtain the vibration signal generated by the one or more vibration sensors. In some embodiments, the vibration signal may be an electrical signal or other forms of signals. In some embodiments, the vibration signal and the sound signal may be collected at the same time or at the same time period. In some embodiments, the vibration signal and the sound signal may be synchronized based on the same clock signal.

In operation 230, a relationship between the noise component in the sound signal and the noise component in the vibration signal may be determined.

Since the noise component in the sound signal and the noise component in the vibration signal are both excited by the environmental noise, there may be a strong correlation between the noise component in the sound signal and the noise component in the vibration signal. Therefore, in some embodiments, the processor 140 may determine the relationship between the noise component in the sound signal and the noise component in the vibration signal based on the sound signal collected by the at least one microphone and the vibration signal collected by the at least one vibration sensor.

It should be noted that, in some embodiments, the sound signal may be collected by a single microphone or a microphone array (i.e., a plurality of microphones).

In some embodiments, the processor 140 may identify a time period during which the user is not talking, determine a first noise signal reflecting the environmental noise from the sound signal during the time period, determine the relationship between the first noise signal and the vibration signal during the time period, and use the relationship between the first noise signal and the vibration signal as the relationship between the noise component in the sound signal and the noise component in the vibration signal when the user is talking.

In some embodiments, when the sound signal is collected by the microphone array, the processor 140 may identify the time period during which the user is talking, determine a second noise signal reflecting the environmental noise from the sound signal during the time period, and determine the correlation between different components of the vibration signal and the second noise signal during the time period. For example, a component in the vibration signal that has a correlation with the second noise signal higher than a preset threshold may be the noise, and a component that has a correlation with the second noise signal lower than a preset threshold may be the user voice.

In some embodiments, when the sound signal is collected by a single microphone, the processor 140 may convert the sound signal and the vibration signal from a time-domain signal to a frequency-domain signal, and obtain a noise relationship between the noise component in the sound signal and the noise component in the vibration signal on at least one frequency domain sub-band. In some embodiments, the noise relationship between the noise component in the sound signal and the noise component in the vibration signal may be expressed as a power ratio or a signal spectrum ratio between the noise component in the sound signal and the noise component in the vibration signal. For more details about determining the noise relationship based on the sound signal collected by the single microphone, refer to other descriptions of the present disclosure (e.g., FIG. 4 and related descriptions), which is not illustrated in detail herein.

In operation 240, a target vibration signal may be obtained by performing noise reduction processing on the vibration signal based at least on the relationship.

In some embodiments, after obtaining the noise relationship between the noise component in the sound signal and the noise component in the vibration signal, the processor 140 may obtain, based on the noise relationship and the noise component in the sound signal, the target vibration signal after performing the noise reduction processing on the vibration signal. That is, a clean vibration signal may be obtained after performing the noise reduction processing.

For example, the processor 140 may determine, based on the noise relationship when the user is not talking, and the noise component (e.g., determined based on the sound signal obtained by the microphone array) in the sound signal when the user is talking, the noise component in the vibration signal when the user is talking, and obtain the target vibration signal by further removing the noise component from the vibration signal when the user is talking. As another example, the processor 140 may obtain the noise relationship between the noise component in the sound signal and the noise component in the vibration signal on at least one frequency domain sub-band based on the noise relationship when the user is not talking, and further, remove the noise component from the vibration signal when the user is talking based on the noise relationship corresponding to the specific frequency domain sub-band and the noise component of the specific frequency domain sub-band when the user is talking.

For more technical details on determining the relationship between the noise component in the sound signal and the noise component in the vibration signal, as well as the noise reduction processing of the vibration signal, refer to other descriptions of the present disclosure (e.g., FIG. 4, FIG. 9, FIG. 10, and related descriptions), which is not illustrated in detail herein.

Figure 3:
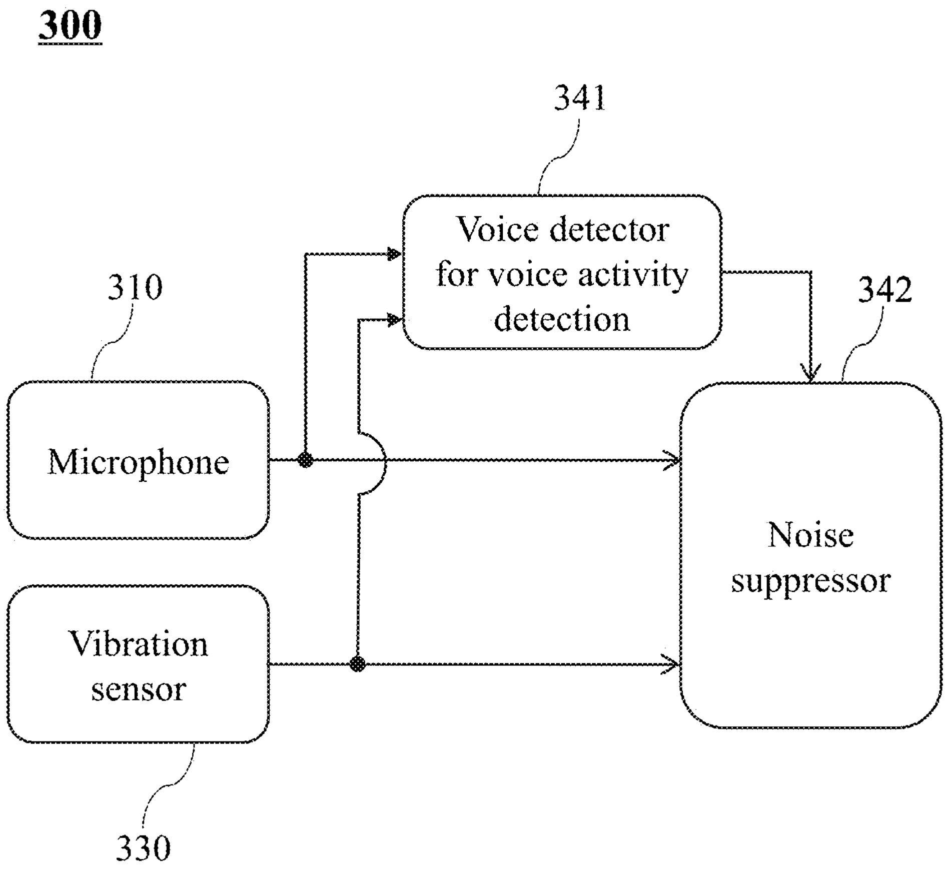
FIG. 3 is a block diagram of a system for processing a signal according to some embodiments of the present disclosure.

FIG. 3 is a block diagram of a system for processing a signal according to some embodiments of the present disclosure.

As shown in FIG. 3, in some embodiments, a system 300 for processing a signal may include a voice detector 341 for voice activity detection and a noise suppressor 342.

In some embodiments, the voice detector 341 for the voice activity detection and the noise suppressor 342 may be part of the processor 140. The voice detector 341 for the voice activity detection may be used to identify the signal segment of the user voice that is included in the sound signal collected by the microphone 310 and the vibration signal collected by the vibration sensor 330. In other words, the voice detector 341 for the voice activity detection may recognize whether the user is talking. The noise suppressor 342 may be used to determine the relationship between the noise component in the vibration signal and the noise component in the sound signal, and obtain the target vibration signal by performing, based on the relationship, the noise reduction processing on the signal segment including the user voice.

In some embodiments, the voice detector 341 for the voice activity detection may use a machine learning model to recognize the user voice within the sound signal and the vibration signal. In some embodiments, data samples may be used to train the machine learning model, so that the machine learning model may obtain the ability to recognize features of the user voice and identify the user voice from the sound signal or the vibration signal. The data samples may include positive data samples and negative data samples. The positive data samples may include a set of sound signal samples and vibration signal samples including the user voice, and the negative data samples may include a set of sound signal samples and vibration signal samples that do not include the user voice.

In some embodiments, the voice detector 341 for the voice activity detection may determine whether the user is talking according to the received sound signal and/or the received vibration signal. For example, considering whether the user is talking or not may affect the strength of the signal generated by the vibration sensor, the voice detector 341 for the voice activity detection may determine whether the user is talking according to the strength of the vibration signal. When the intensity of the vibration signal exceeds a first threshold, the voice detector 341 for the voice activity detection may determine that the user is talking at the corresponding moment. Alternatively, when the change in the intensity of the vibration signal exceeds a second threshold, the voice detector 341 for the voice activity detection may determine that the user starts to talk at the corresponding moment. For another example, the voice detector 341 for the voice activity detection may determine whether the user is talking according to a ratio of the vibration signal to the sound signal. When an intensity ratio of the vibration signal to the sound signal exceeds a third threshold, the voice detector 341 for the voice activity detection may determine that the user is talking at the corresponding moment. Alternatively, before determining the ratio of the vibration signal to the sound signal, the voice detector 341 for the voice activity detection (or other similar components) may perform the noise reduction processing on the vibration signal and/or the sound signal.

Figure 4:
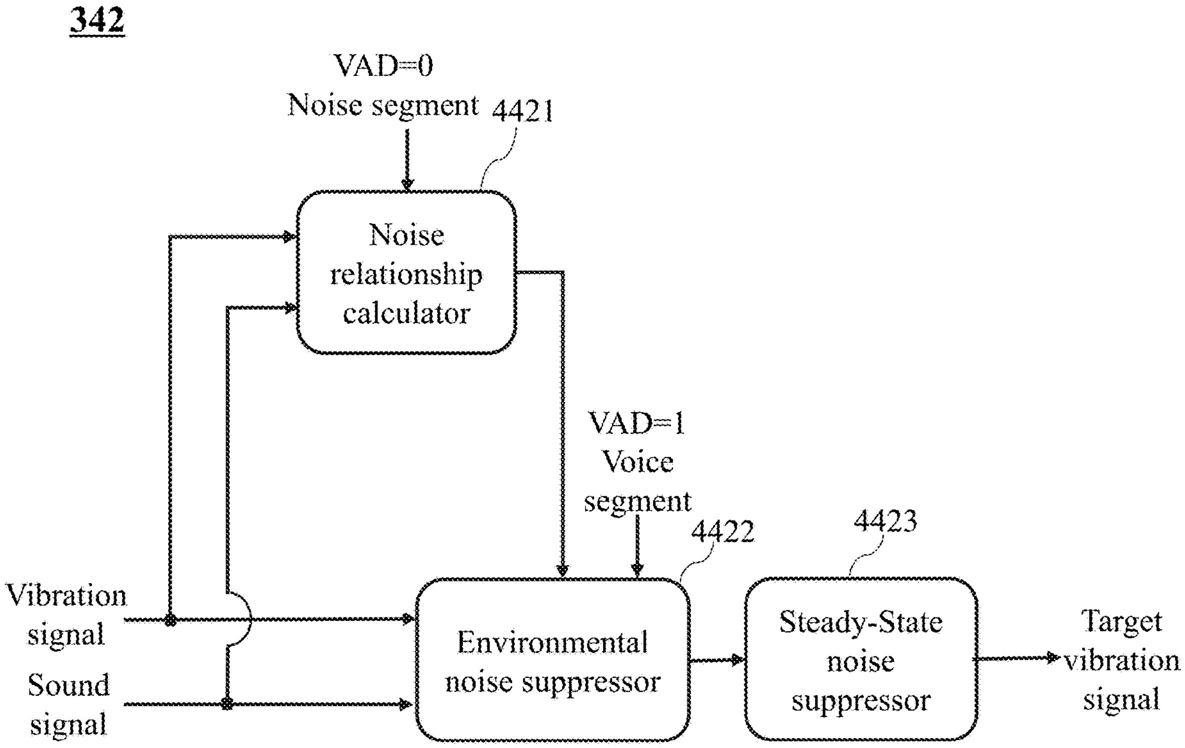
FIG. 4 is a schematic diagram illustrating a working principle of a noise suppressor for a vibration sensor in a system for processing a signal according to some embodiments of the present disclosure.

FIG. 4 is a schematic diagram illustrating a structure of a noise suppressor for a vibration sensor in a system for processing a signal according to some embodiments of the present disclosure. As shown in FIG. 4, in some embodiments, the noise suppressor 342 may include a noise relationship calculator 4421 and an environmental noise suppressor 4422.

In some embodiments, an output result of the voice detector 341 for the voice activity detection may be used as an input of the noise relationship calculator 4421 and the environmental noise suppressor 4422. Specifically, in some embodiments, the noise relationship calculator 4421 may determine the relationship between the noise component in the sound signal and the noise component in the vibration signal based on the signal segment that does not include the user voice (i.e., the noise segment that is expressed as VAD=0) within the sound signal and the vibration signal. Since during the time period that does not include the user voice, both the vibration signal and the sound signal only include the noise component, therefore, the relationship between the noise component in the sound signal and the noise component in the vibration signal may be equivalent to the relationship between the sound signal and the vibration signal. The environmental noise suppressor 4422 may obtain the target vibration signal by performing the noise reduction processing on the signal segment including the user voice within the vibration signal (i.e., the voice segment that is expressed as VAD=1) based on the relationship between the noise component in the sound signal and the noise component in the vibration signal.

To facilitate understanding, the following may describe the sound signal collected by a single microphone. When the user is not talking (i.e., VAD=0), the sound signal collected by the microphone may be expressed as:

$$y(t)=n_y(t). \quad (1)$$

The vibration signal collected by the vibration sensor at the same time may be expressed as:

$$x(t)=n_x(t). \quad (2)$$

The relationship h(t) between the noise component in the vibration signal and the noise component in the sound signal may be expressed as:

$$x(t)=h(t)*y(t). \quad (3)$$

In some embodiments, when no user voice is detected by the voice detector 341 for the voice activity detection, the noise relationship calculator 4421 may update the noise relationship h(t) in real time. When the voice detector 341 for the voice activity detection detects that the current signal includes a user voice signal, the noise relationship calculator 4421 may stop updating the noise relationship between the vibration signal and the sound signal. In some embodiments, a frequency of updating the noise relationship by the noise relationship calculator 4421 may be related to the intensity of the noise. When the noise is small, the update of the noise relationship may be less, or the update may be stopped.

The environmental noise suppressor 4422 may be used to suppress the environmental noise component in the vibration signal when the user is talking. In some embodiments, an input signal of the environmental noise suppressor 4422 may include a vibration signal, a sound signal, the latest updated noise relationship, and an output signal of the voice detector 341 for the voice activity detection. In some embodiments, when the user voice and the environmental noise exist at the same time, the vibration signal may be expressed as:

$$x(t)=s_x(t)+n_x(t). \quad (4)$$

wherein $s_x(t)$ refers to the user voice received by the vibration sensor, and $n_x(t)$ refers to the environmental noise received by the vibration sensor. Similarly, when there are both the user voice and the environmental noise, the sound signal in a noisy environment may be expressed as:

$$y(t)=s_y(t)+n_y(t). \quad (5)$$

wherein $s_y(t)$ refers to the user voice received by the microphone, and $n_y(t)$ refers to the environmental noise received by the microphone. The relationship h(t) between the environmental noise received by the vibration sensor and the environmental noise received by the microphone may be approximately expressed as:

$$n_x(t)=h(t)*n_y(t). \quad (6)$$

In some embodiments, the sound signal and the vibration signal may be converted to the frequency domain. Specifically, the converted vibration signal may be expressed as:

$$X(\omega)=S_X(\omega)+N_X(\omega). \quad (7)$$

wherein $S_X(\omega)$ refers to a frequency domain distribution of the user voice received by the vibration sensor, and $N_X(\omega)$ refers to a frequency domain distribution of the environmental noise signal received by the vibration sensor. The converted sound signal may be expressed as:

$$Y(\omega)=S_Y(\omega)+N_Y(\omega). \quad (8)$$

wherein $S_Y(\omega)$ refers to a frequency domain distribution of the user voice received by the microphone, and $N_Y(\omega)$ refers to a frequency domain distribution of the environmental noise signal received by the microphone. The relationship between the environmental noise signal received by the vibration sensor and the environmental noise received by the microphone may be expressed as:

$$N_X(\omega)=H(\omega)*N_Y(\omega). \quad (9)$$

wherein $H(\omega)$ is a frequency domain expression of the noise relationship h(t) in equation (3), and refers to the noise relationship between the noise component in the sound signal and the noise component in the vibration signal in the frequency domain.

Figure 12:
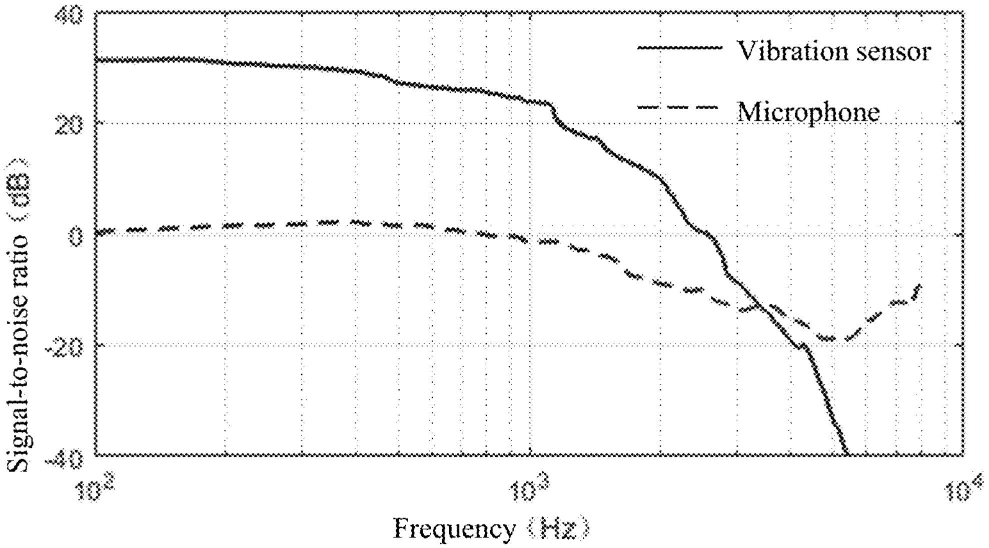
FIG. 12 is a curve diagram illustrating a frequency-signal-to-noise ratio of a signal according to some embodiments of the present disclosure.

In some embodiments, considering that when a frequency range is lower than a certain frequency range, such as lower than 3000 Hz, the signal-to-noise ratio of the sound signal received by the microphone may be less than the signal-to-noise ratio of the vibration signal received by the vibration sensor (for more description of the signal-to-noise ratio of the sound signal and the vibration signal, refer to FIG. 12), the sound signal collected by the microphone may be approximately used as an estimate of the noise signal, that is:

$$Y(\omega)\approx N_Y(\omega). \quad (10)$$

Further, according to equation (7), equation (9), and equation (10), a frequency domain expression of the vibration signal after the noise reduction processing may be expressed as:

$$S(\omega)=S_X(\omega)=X(\omega)-N_X(\omega)=X(\omega)-H(\omega)*N_Y(\omega)\approx X(\omega)-H(\omega)*Y(\omega). \quad (11)$$

wherein the meaning of each parameter refers to the description mentioned above, which may not be limited herein.

In some embodiments, the voice detector 341 for the voice activity detection may be used as an activation switch. When the sound signal and the vibration signal do not include the user voice (i.e., VAD=0), the noise relationship calculator 4421 may be turned on to update the noise relationship between the sound signal and the vibration signal, and the environmental noise suppressor 4422 may be turned off. When the sound signal and the vibration signal include the user voice (i.e., VAD=1), the update of the noise relationship between the sound signal and the vibration signal may be stopped, and the environmental noise suppressor 4422 may be turned on to perform the noise reduction processing on the vibration signal. By using the method mentioned above to control a working status of the noise relationship calculator 4421 and the environmental noise suppressor 4422, unnecessary processing resource occupation by the noise relationship calculator 4421 and the environmental noise suppressor 4422 may be avoided, thereby reducing the computing load of the processor to a certain extent.

Figure 5:
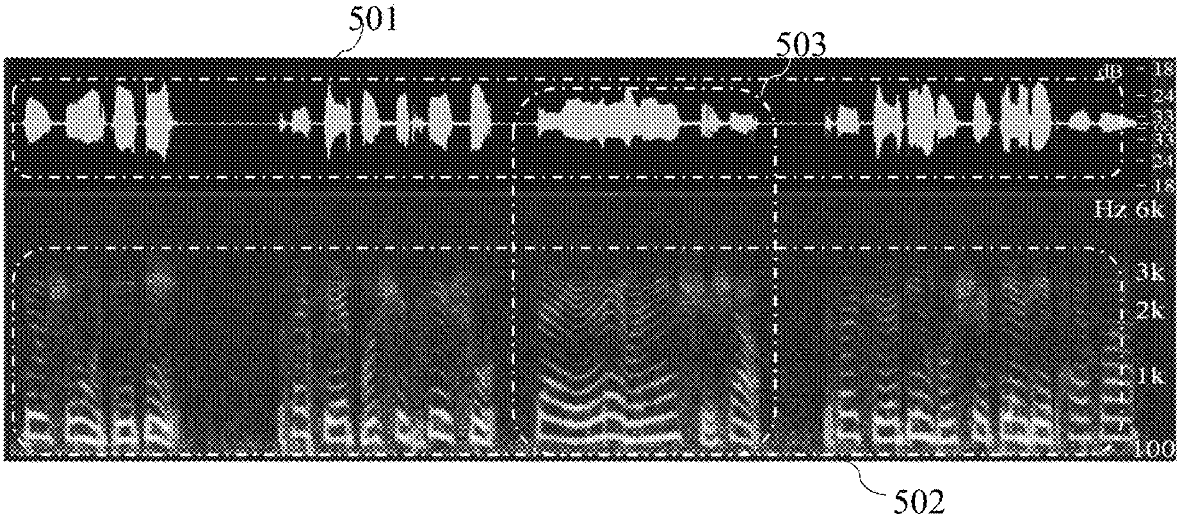
FIG. 5 is a schematic diagram illustrating a signal spectrum of a vibration sensor according to some embodiments of the present disclosure.

As shown in FIG. 4, in some embodiments, the noise suppressor 342 may also include a steady-state noise suppressor 4423. The steady-state noise suppressor 4423 may be used to eliminate the steady-state noise (e.g., a noise floor, etc.) in the signal generated by the vibration sensor. In some embodiments, the vibration signal collected by the vibration sensor may have the noise floor (also referred to as background noise). In a specific frequency range, the noise floor may seriously affect the voice signal. Specifically, when the vibration sensor is used to collect the user voice, since the skins and the bones have a low-pass filtering effect on the transmission of voice, therefore, the vibration sensor may receive less high-frequency voice signals, and the high-frequency components of the voice signal in the vibration signal generated by the vibration sensor may also be less. FIG. 5 is a schematic diagram illustrating a frequency spectrum of a vibration signal generated by a vibration sensor according to some embodiments of the present disclosure. As shown in FIG. 5, the frame 501 may refer to a time domain signal corresponding to the vibration signal generated by the vibration sensor. The frame 502 may refer to a frequency domain signal corresponding to the vibration signal generated by the vibration sensor. During the time period corresponding to the voice signal (e.g., as is shown in the frame 503), the signal strength of the frequency domain signal may be stronger below 1 kHz, and the signal strength may be weaker at a higher frequency (e.g., above 2 kHz). As may be seen from FIG. 5, in the signal received by the vibration sensor when the user is talking, there may be more low-frequency components and fewer high-frequency components.

In the frequency band that the user voice signal in the vibration signal is small, for example, in the range of 2 kHz-8 kHz, the user voice signal collected by the vibration sensor may have a smaller signal-to-noise ratio with respect to the noise floor. In such case, the vibration signal collected by the vibration sensor may be processed by the steady-state noise suppressor 4423, so as to reduce the influence of the noise floor on the user voice signal. In some embodiments, the steady-state noise suppressor 4423 may use methods or devices such as spectral subtraction, Wiener filter, adaptive filter, or the like, to eliminate the noise floor.

Figure 6:
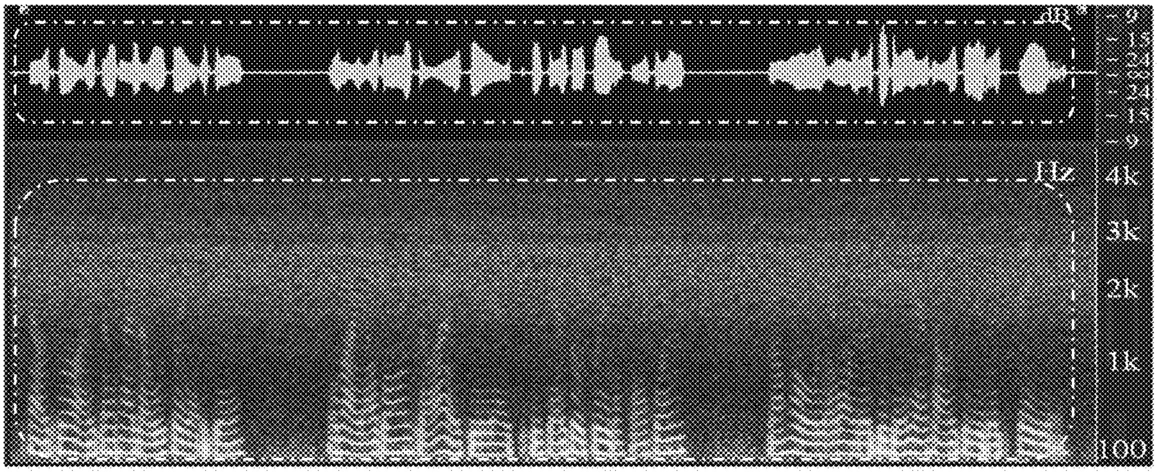
FIG. 6 is a schematic diagram illustrating a signal spectrum received by a vibration sensor in noisy environment according to some embodiments of the present disclosure.

FIG. 6 is a schematic diagram illustrating a signal spectrum received by a vibration sensor in noisy environment according to some embodiments of the present disclosure. As may be seen from FIG. 6, the voice signal (i.e., the signal corresponding to the user voice) may be less interfered by a noise signal within 1000 Hz, and the voice signal may be relatively clear. The voice signal may be relatively less affected by a noise signal within 1000 Hz-1500 Hz, but the signal-to-noise ratio may be less than 1000 Hz. The voice signal may be greatly affected by the noise with a frequency above 1500 Hz, and the voice signal may be basically "overwhelmed" by the noise signal. On one hand, the higher the frequency may be, the smaller the voice signal received by the vibration sensor may be. On the other hand, the vibration sensor may be easier to receive high-frequency environmental noise signals.

Figure 7:
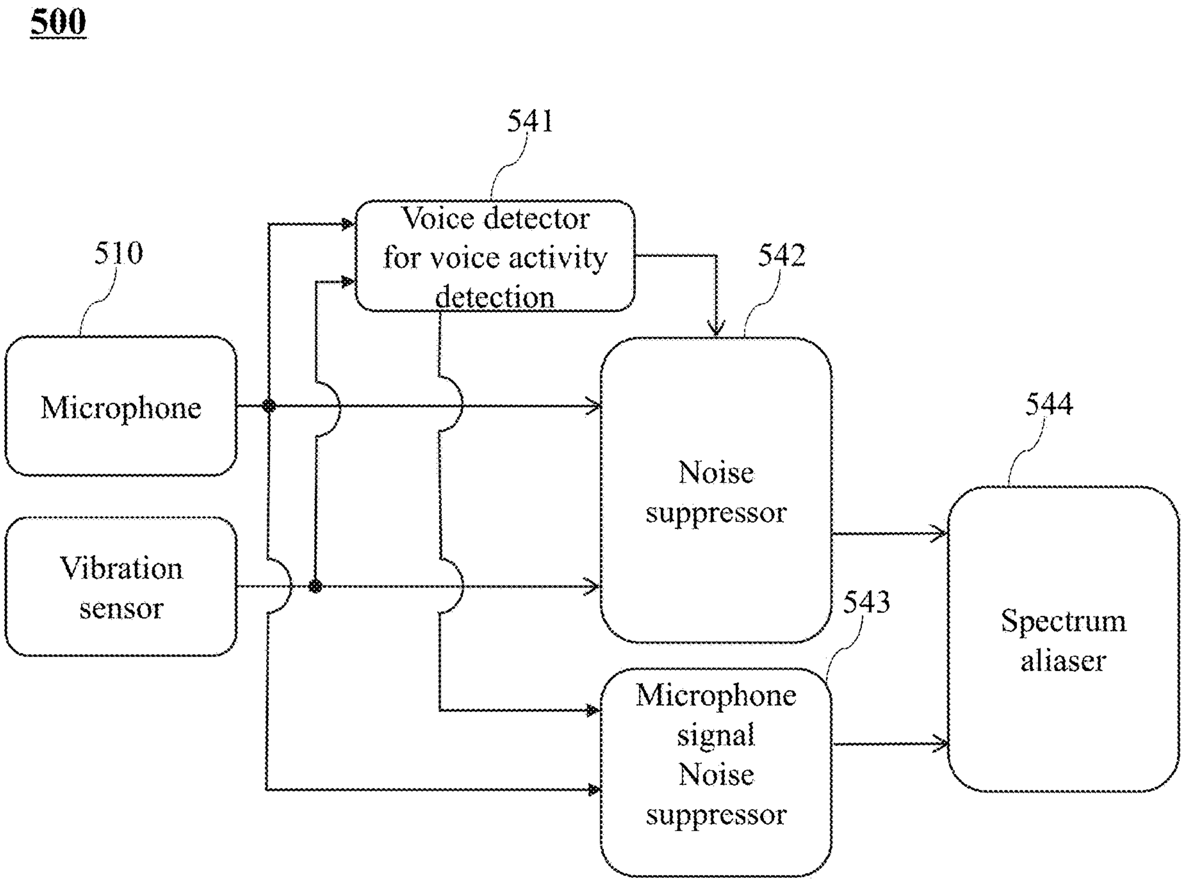
FIG. 7 is another block diagram of a system for processing a signal according to some embodiments of the present disclosure.

FIG. 7 is another block diagram of a system for processing a signal according to some embodiments of the present disclosure. As shown in FIG. 7, in some embodiments, the system 500 may include a microphone signal noise suppressor 543, and the microphone signal noise suppressor 543 may be used to reduce the noise of the sound signal collected by the at least one microphone 510 to obtain a clean air conduction voice signal. As shown in FIG. 7, the output signal of the voice detector 541 for the voice activity detection and the sound signal generated by the microphone 510 may be used as the input signal of the microphone signal noise suppressor 543 at the same time. In some embodiments, the microphone signal noise suppressor 543 may process only the signal segment including the user voice in the sound signal collected by the microphone 510 based on the identified result of the voice detector 541 for the voice activity detection. For example, when the voice detector 541 for the voice activity detection determines that the user is talking, the microphone signal noise suppressor 543 may perform the noise reduction processing on the sound signal output by the microphone 510 to generate a target sound signal.

As is shown in FIG. 7, in some embodiments, the system 500 may also include a spectrum aliaser 544. The spectrum aliaser 544 may be used to perform spectrum aliasing processing on the target vibration signal processed by the noise suppressor 542 and the target sound signal processed by the microphone signal noise suppressor 543. For example, the spectrum aliaser 544 may alias a part of the target vibration signal (e.g., a low-frequency part) with a part of the target sound signal (e.g., a high-frequency part) to form a target signal with a full frequency band. In some embodiments, the frequency of the part used for aliasing in the target vibration signal may be smaller than the frequency of the part used for aliasing in the target sound signal. In some embodiments, the highest frequency of the part used for aliasing in the target vibration signal may be equal to or greater than the minimum frequency of the part used for aliasing in the target sound signal.

In some embodiments, the frequency range of the target vibration signal and the frequency range of the target sound signal may overlap with each other. For example, the frequency range of the target vibration signal may be between 0 Hz and 2000 Hz, and the frequency range of the target sound signal may be between 1000 Hz and 8000 Hz. As another example, the frequency range of the target vibration signal may be between 0 Hz and 2000 Hz, and the frequency range of the target sound signal may be between 0 Hz and 10 kHz. Alternatively, the spectrum aliaser 544 may include one or more filter circuits for filtering the aliased part of the target vibration signal and/or the aliased part of the target sound signal before mixing. It should be noted that the data mentioned above is only exemplary. In some embodiments, the frequency range of the target vibration signal and the target sound signal may be, but is not limited to the numerical range mentioned above.

It should be noted that, compared to FIG. 3, the system for processing a signal shown in FIG. 7 adds the microphone signal noise suppressor 543 and the spectrum aliaser 544. The common parts between FIG. 7 and FIG. 3 may refer to the related description of FIG. 3. For example, for more technical details about the voice detector 541 for the voice activity detection, refer to the voice detector 341 for the voice activity detection in FIG. 3, which is not repeated herein.

Figure 8:
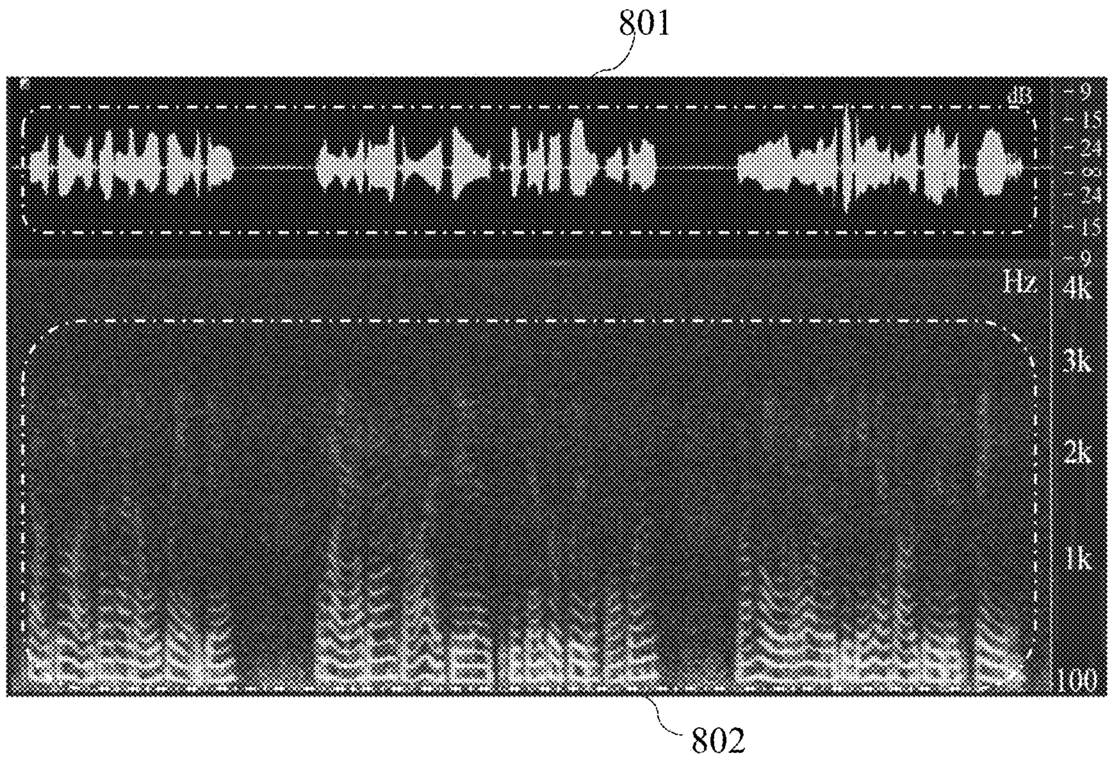
FIG. 8 is a schematic diagram of a processed signal spectrum according to some embodiments of the present disclosure.

FIG. 8 is a schematic diagram of a processed signal spectrum according to some embodiments of the present disclosure. The frame 801 may refer to the time domain signal obtained after processing the vibration signal generated by the vibration sensor. The frame 802 may refer to the frequency domain signal obtained after processing the vibration signal generated by the vibration sensor.

Compared to FIG. 6, it may be seen from FIG. 8 that the processing method mentioned above has obvious noise reduction effect for the noise within 1500 Hz-4000 Hz. The target signal processed by the method mentioned above not only retains the low-frequency (e.g., 0-1000 Hz) user voice signal, but also reduces the noise of the medium and high frequency (e.g., 1500-4000 Hz) vibration signal to obtain a target signal with the high signal-to-noise ratio.

Figure 9:
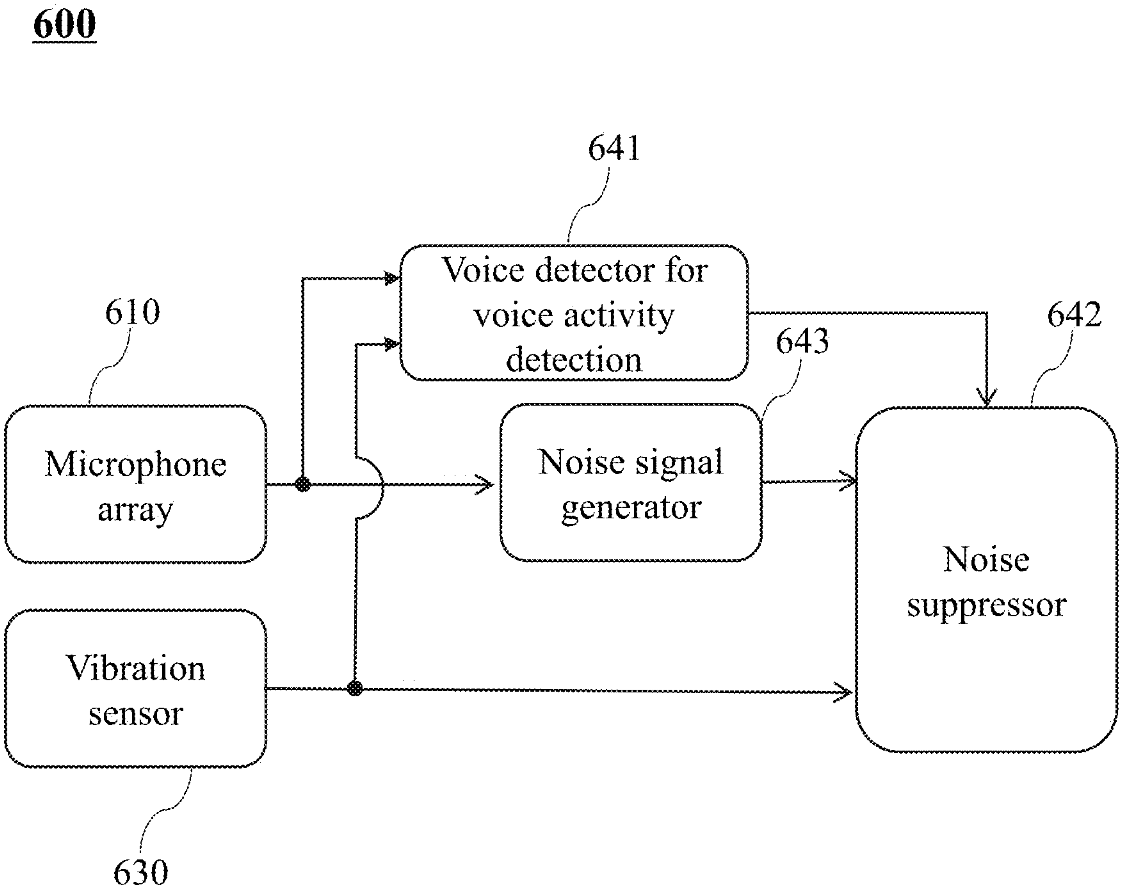
FIG. 9 is another block diagram of a system for processing a signal according to some embodiments of the present disclosure.

FIG. 9 is another block diagram of a system for processing a signal according to some embodiments of the present disclosure. As shown in FIG. 9, in some embodiments, a system 600 may include a noise signal generator 643, which may be part of the processor. In some embodiments, due to the difference in the direction of each microphone in the microphone array 610 relative to the sound source, a certain difference in the amplitude and/or phase of the sound signal collected by different microphones in the microphone array 610 may be generated. Based on the principle mentioned above, the noise signal generator 643 may determine a first noise signal from the collected sound signal based on the relative position relationship between the microphones in the microphone array 610. In some embodiments, the first noise signal may be a noise signal with a specific direction in the environment. For example, the first noise signal may be a noise signal synthesized from noise in all directions except the direction of the user voice in the environment. It should be noted that the common parts between the system for processing a signal shown in FIG. 9 and the system shown in FIG. 3 may refer to the related description of FIG. 3. For example, more technical details about the voice detector 641 for the voice activity detection may refer to the voice detector 341 for the voice activity detection in FIG. 3, which is not repeated herein.

In some embodiments, the noise suppressor 642 may determine the relationship between the first noise signal and the vibration signal collected by the vibration sensor 630 based on the method described elsewhere in the present disclosure, and perform the noise reduction processing on the vibration signal based on the relationship.

In some embodiments, when the noise suppressor 642 determines the relationship between the first noise signal and the vibration signal collected by the vibration sensor 630, if there is no user voice and there is only noise, the vibration signal may be expressed as $x(t)=n_x(t)$, the first noise signal may be expressed as n(t), and the relationship between the vibration signal and the first noise signal may be expressed as:

$$x(t)=h(t)*n(t). \tag{12}$$

wherein h(t) refers to the calculated noise relationship.

In some embodiments, if the user voice and the noise exist at the same time, the vibration signal in a noisy environment may be expressed as:

$$x(t)=s(t)+n_x(t). \tag{13}$$

wherein s(t) may refer to the user voice, $n_x(t)$ may refer to the environmental noise received by the vibration sensor. The relationship between the environmental noise $n_x(t)$ received by the vibration sensor and the first noise signal may be approximately expressed as:

$$n_x(t)=h(t)*n(t). \tag{14}$$

According to equation (13) and equation (14), the environmental noise may be removed from the vibration signal to obtain a clean user voice signal.

In some embodiments, the noise suppressor 642 may take components in the vibration signal that are correlated with the noise signal greater than a preset threshold (e.g., 60%, 80%, 90%, etc.) as the noise, and take components in the vibration signal that are correlated with the noise signal less than the preset threshold as the user voice.

For example, the noise suppressor 642 may identify a time interval of the user voice, determine a second noise signal reflecting the environmental noise from the sound signal in the time interval (e.g., recognizing the sound from the direction different from the mouth of the user through the microphone array), and determine the correlation between different components in the vibration signal in the time interval and the second noise signal. For example, the components in the vibration signal that are correlated with the second noise signal greater than the preset threshold may be the noise, and the components in the vibration signal that are correlated with the second noise signal less than the preset threshold may be the user voice.

Figure 10:
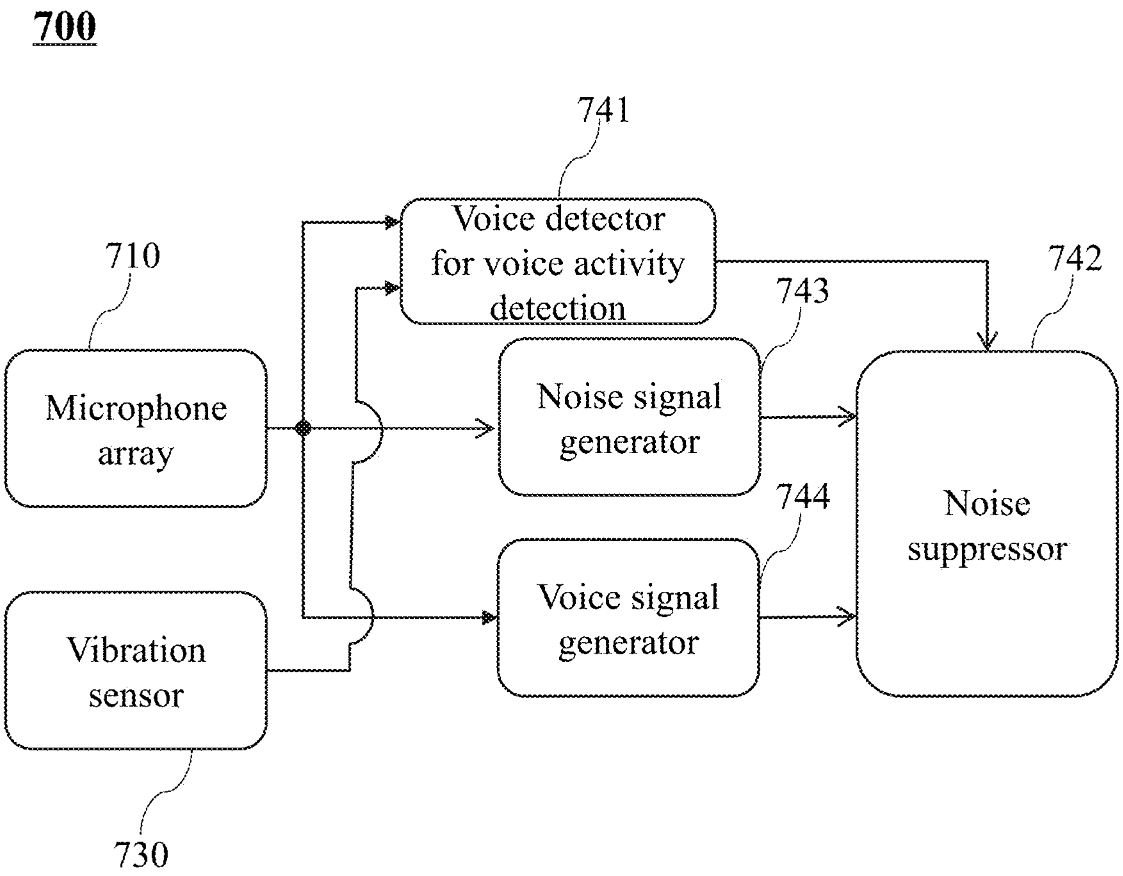
FIG. 10 is another block diagram of a system for processing a signal according to some embodiments of the present disclosure.

FIG. 10 is another block diagram of a system for processing a signal according to some embodiments of the present disclosure.

As shown in FIG. 10, in some embodiments, a system 700 may include a noise signal generator 743 and a voice signal generator 744. The noise signal generator 743 and the voice signal generator 744 may be part of the processor 140. The noise signal generator 743 may determine the first noise signal from the collected sound signal based on the relative position relationship between the microphones in the microphone array 710. The voice signal generator 744 may determine a first voice signal from the collected sound signal based on the relative position relationship between the microphones in the microphone array 710. In some embodiments, the first noise signal may represent the noise in a specific direction in the environment collected by the microphone array 710. For example, the first noise signal may be a noise signal synthesized from noise in all directions except the direction of the user voice in the environment. The first voice signal may represent the sound from the direction of the mouth of the user in the sound signal collected by the microphone array 710, that is, the user voice.

In some embodiments, when the microphone array 710 is a beam-forming microphone array, the first noise signal may be a signal of a noise beam. When the microphone array 710 is another type of array, the first noise signal may be noise calculated through other methods. In some embodiments, when the microphone array 710 is a beam-forming microphone array, the first voice signal may be a signal of a voice beam. When the microphone array 710 is another type of array, the first voice signal may be a voice signal calculated through other methods.

In some embodiments, the system 700 may also include a microphone signal noise suppressor 742, which may be part of the processor. In some embodiments, the microphone signal noise suppressor 742 may perform the noise reduction processing on the voice signal collected by the microphone array 710 based on the first noise signal and the first voice signal to obtain the target voice signal. For example, the microphone signal noise suppressor 742 may further process the first voice signal to remove components with the same characteristics as the first noise signal from the first voice signal, thereby obtaining the target voice signal. In some embodiments, the microphone signal noise suppressor 742 may directly use the first voice signal as the target voice signal.

In some embodiments, the target voice signal processed by the microphone signal noise suppressor 742 may be aliased with the target vibration signal that may be processed by the vibration sensor noise suppressor 642 to form a full-band target signal. In some embodiments, the frequency of the part used for aliasing in the target vibration signal may be smaller than the frequency of the part used for aliasing in the target sound signal. In some embodiments, the highest frequency of the part used for aliasing in the target vibration signal may be equal to or greater than the minimum frequency of the part used for aliasing in the target sound signal.

In some embodiments, the output signal of the voice detector 741 for the voice activity detection may be used as the input signal of the microphone signal noise suppressor 742. The input signal of the voice detector 741 for the voice signal detection may include the sound signal collected by the microphone array 710 and the vibration signal collected by the vibration sensor 730. Specifically, the microphone signal noise suppressor 742 may perform the noise reduction processing only on the signal segment of the voice signal that includes the user voice based on an identification result of the voice detector 741 for the voice activity detection. It should be noted that the common parts between the system for processing a signal shown in FIG. 10 and the system shown in FIG. 9 may refer to the related description of FIG. 9. For example, more technical details about the voice detector 741 for the voice activity detection may refer to the voice detector 641 for the voice activity detection in FIG. 9, which is not repeated herein.

Considering that when using microphone(s) to estimate the noise, the microphone array may better estimate the noise in other directions other than the direction of the source of the user voice (that is, the direction of the mouth of the user), but it may be difficult to obtain the noise that is close to or the same as the direction of the source of the user voice. When a single microphone signal is designated as the noise estimation, although the processed noise may include the direction of the mouth of the user, the noise may only be processed in the frequency band that the signal-to-noise ratio is less than that of the vibration sensor, which may not reduce the noise in other frequency bands. Therefore, in some embodiments, the noise reduction processing of the microphone array and the noise reduction processing of the single microphone may be combined to achieve a better noise reduction effect.

Figure 11:
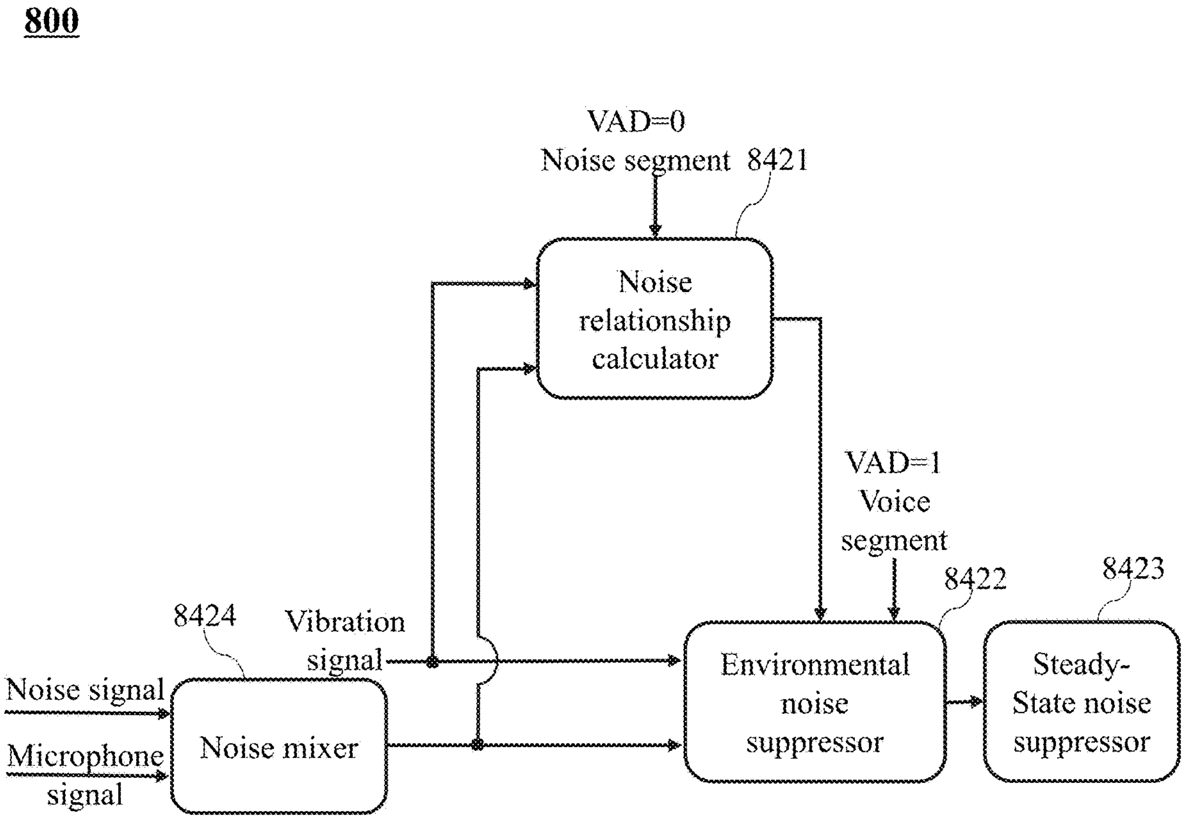
FIG. 11 is another block diagram of a system for processing a signal according to some embodiments of the present disclosure.

FIG. 11 is another block diagram of a system for processing a signal according to some embodiments of the present disclosure.

As shown in FIG. 11, in some embodiments, in order to combine the advantages of the noise reduction of the microphone array and the noise reduction of the single microphone, a noise mixer 8424 may be added into a system 800. The noise mixer 8424 may be part of the processor 140. In some embodiments, the input signal of the noise mixer 8424 may include a microphone signal collected by a microphone. For example, the noise signal may be derived from the first noise signal generated by the noise signal generator 643 in FIG. 9. The microphone signal may be derived from the output signal of one of the microphones in the microphone array 610 in FIG. 9 or the output signal of the microphone 510 in FIG. 7. In some embodiments, the noise mixer 8424 may mix the noise signal with the microphone signal to generate a sound signal. Compared with the sound signal input into the noise relationship calculator in FIG. 4, the sound signal may reflect the noise characteristics more accurately, so that the accuracy of the noise estimation may be improved.

As shown in FIG. 11, the noise relationship calculator 8421 may determine the noise relationship based on the vibration signal collected by the at least one vibration sensor and the signal segment of the sound signal generated by the noise mixer 8424 that does not include the user voice (i.e., the noise segment with VAD=0).

It should be understood that by adding the noise mixer 8424, the mixed sound signal may increase the noise in the same direction as the user voice compared to the first noise signal, and reduce the user voice signal compared with the noise signal. The result may be better than using the noise signal alone or using the microphone signal alone, and a more reliable noise estimation may be obtained and the accuracy of the noise estimation may be improved.

In some embodiments, a mixing manner of the noise signal and the microphone signal may be based on a fixed ratio or other methods. In some embodiments, the noise mixer 8424 may obtain a noise level from the direction of the user voice, and determine a mixing ratio of the noise signal and the microphone signal based on the noise level. For example, the greater the noise in the same direction as the user voice, the greater the mixing ratio of the microphone signal.

It should be noted that the common parts between the system for processing a signal shown in FIG. 11 and the system shown in FIG. 4 may refer to the related description of FIG. 4. For example, more technical details about the environmental noise suppressor 8422 and the steady-state noise suppressor 8423 may refer to the environmental noise suppressor 4422 and the steady-state noise suppressor 4423 in FIG. 4, which is not repeated herein.

FIG. 12 is a curve diagram illustrating a frequency-signal-to-noise ratio of a signal according to some embodiments of the present disclosure.

It should be noted that the signal-to-noise ratio of the sound signal received by the microphone may be different from the signal-to-noise ratio of the vibration signal received by the vibration sensor. As shown in FIG. 12, in the frequency range less than 3000 Hz, the signal-to-noise ratio of the vibration sensor may be greater than that of the microphone. In the frequency range of 4000 Hz-8000 Hz, the signal-to-noise ratio of the vibration sensor may be less than that of the microphone. The signal-to-noise ratios of the microphone and the vibration sensor may overlap with each other in the range of 3000 Hz-4000 Hz. In some embodiments, the sound signal collected by the microphone may be approximately taken as a noise signal estimation in a lower frequency range (e.g., less than 3000 Hz). Considering that the signal-to-noise ratio of the vibration signal decreases as the frequency increases, in some embodiments, when performing spectrum aliasing on the target sound signal and the target vibration signal, the highest frequency of the part used for aliasing in the target vibration signal may be set to be not greater than 3000 Hz but not less than 1000 Hz. In some embodiments, the highest frequency of the part used for aliasing in the target vibration signal may be set to be not greater than 2500 Hz but not less than 1500 Hz. In some embodiments, the highest frequency of the part used for aliasing in the target vibration signal may be set to be not greater than 2000 Hz but not less than 1000 Hz.

It should be noted that the description of the signal-to-noise ratios of the vibration sensor and the microphone may be merely for illustrative purposes. In some embodiments, when the position of the vibration sensor or the position of the microphone changes, there may be a difference when comparing the signal-to-noise ratios of the vibration sensor and the microphone, and the position that the signal-to-noise ratios of the vibration sensor and the microphone overlap with each other may also change.

The embodiments of the present disclosure also provide a non-transitory computer readable medium. The storage medium may store at least one set of instructions. After the computer reads the at least one set of instructions in the storage medium, the computer may perform the operations corresponding to the method for processing a signal.

It should be noted that the storage medium may be included in an electronic device, a processor, or a server. The storage medium may also exist alone, which may not be assembled into the electronic device, the processor, or the server.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. In addition, some features, structures, or features in the present disclosure of one or more embodiments may be appropriately combined.

Further, it will be appreciated by one skilled in the art, aspects of the present disclosure may be illustrated and described herein in any of a number of patentable classes or context including any new and useful process, machine, manufacture, or collocation of matter, or any new and useful improvement thereof. Accordingly, all aspects of the present disclosure may be performed entirely by hardware, may be performed entirely by softwares (including firmware, resident softwares, microcode, etc.), or may be performed by a combination of hardware and softwares. The above hardware or softwares can be referred to as "data block", "module", "engine", "unit", "component" or "system". In addition, aspects of the present disclosure may appear as a computer product located in one or more computer-readable media, the product including computer-readable program code.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, numbers describing the number of ingredients and attributes are used. It should be understood that such numbers used for the description of the embodiments use the modifier "about", "approximately", or "substantially" in some examples. Unless otherwise stated, "about", "approximately", or "substantially" indicates that the number is allowed to vary by ±20%. Correspondingly, in some embodiments, the numerical parameters used in the description and claims are approximate values, and the approximate values may be changed according to the required characteristics of individual embodiments. In some embodiments, the numerical parameters should consider the prescribed effective digits and adopt the method of general digit retention. Although the numerical ranges and parameters used to confirm the breadth of the range in some embodiments of the present disclosure are approximate values, in specific embodiments, settings of such numerical values are as accurate as possible within a feasible range.

For each patent, patent application, patent application publication, or other materials cited in the present disclosure, such as articles, books, specifications, publications, documents, or the like, the entire contents of which are hereby incorporated into the present disclosure as a reference. The application history documents that are inconsistent or conflict with the content of the present disclosure are excluded, and the documents that restrict the broadest scope of the claims of the present disclosure (currently or later attached to the present disclosure) are also excluded. It should be noted that if there is any inconsistency or conflict between the description, definition, and/or use of terms in the auxiliary materials of the present disclosure and the content of the present disclosure, the description, definition, and/or use of terms in the present disclosure is subject to the present disclosure.

At last, it should be understood that the embodiments described in the present disclosure are merely illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A system for processing a signal, comprising:

at least one microphone configured to collect a sound signal, the sound signal including at least one of user voice and environmental noise;

at least one vibration sensor configured to collect a vibration signal, the vibration signal including at least one of the user voice and the environmental noise; and a processor configured to:

identify signal segments excluding the user voice within the sound signal and the vibration signal, respectively;

determine, in the identified signal segments excluding the user voice within the sound signal and the vibration signal, a relationship between a noise component in the sound signal and a noise component in the vibration signal;

determine a noise component in the sound signal in signal segments including the user voice;

determine, based on the relationship and the noise component in the sound signal in the signal segments including the user voice, a noise component in the vibration signal in the signal segments including the user voice; and obtain a target vibration signal by removing the noise component in the vibration signal in the signal segments including the user voice, wherein the at least one microphone includes a microphone array, the microphone array includes a plurality of microphones, and to determine, in the identified signal segments excluding the user voice within the sound signal and the vibration signal, the relationship between the noise component in the sound signal and the noise component in the vibration signal, the processor is further configured to:

determine a first noise signal from the sound signal based on a relative positional relationship between the plurality of microphones in the microphone array in the identified signal segments excluding the user voice within the sound signal and the vibration signal, respectively, wherein the first noise signal is a noise signal synthesized from noises in all directions except a direction of the user voice in the environment; and determine a relationship between the first noise signal and the vibration signal.

2. The system of claim 1, wherein the processor is further configured to obtain the target vibration signal by suppressing steady-state noise in the vibration signal.

3. The system of claim 1, wherein the processor is further configured to convert the sound signal and the vibration signal from a time domain signal to a frequency domain signal; and obtain a noise relationship between the noise component in the sound signal and the noise component in the vibration signal on at least one frequency domain sub-band.

4. The system of claim 1, wherein the processor is further configured to obtain a target sound signal by performing a noise reduction processing on the sound signal in one of the signal segments including the user voice of the sound signal.

5. The system of claim 4, wherein the processor is further configured to obtain a target signal by aliasing at least part of components in the target vibration signal with at least part of components in the target sound signal, wherein frequencies of the at least part of the components in the target vibration signal are less than frequencies of the at least part of the components in the target sound signal.

6. The system of claim 1, wherein the processor is further configured to:

determine a first voice signal from the sound signal based on the relative positional relationship between the plurality of microphones in the microphone array in one of the signal segments including the user voice; and obtain a target sound signal by performing, based on the first noise signal and the first voice signal, a noise reduction processing on the sound signal, or designate the first voice signal as the target sound signal.

7. The system of claim 1, including:

a noise mixer, and to generate the sound signal, the processor is configured to perform operations including:

obtaining a microphone signal collected by at least one target microphone in the plurality of microphones; and generating the sound signal by mixing the first noise signal and the microphone signal via the noise mixer.

8. The system of claim 7, wherein the noise mixer is configured to:

obtain a noise level along the direction of the user voice; and determine, based on the noise level, a mixing ratio of the first noise signal to the microphone signal.

9. The system of claim 1, wherein a signal-to-noise ratio of the at least one vibration sensor is greater than a signal-to-noise ratio of the at least one microphone in at least part of a frequency range.

10. The system of claim 1, further comprises a noise relationship calculator, the processor configured to:

detect whether the sound signal and the vibration signal include the user voice, when the sound signal and the vibration signal do not include the user voice, updating the relationship between the noise component in the sound signal and the noise component in the vibration signal by the noise relationship calculator; and when the sound signal and the vibration signal include the user voice, stop updating the relationship between the noise component in the sound signal and the noise component in the vibration signal, and performing noise reduction processing on the vibration signal to obtain the target vibration signal.

11. A method for processing a signal, comprising:

collecting a sound signal by at least one microphone, the sound signal including at least one of user voice and environmental noise;

collecting a vibration signal by at least one vibration sensor, the vibration signal including at least one of the user voice and the environmental noise;

identifying signal segments excluding the user voice within the sound signal and the vibration signal, respectively;

determining, in the identified signal segments excluding the user voice within the sound signal and the vibration signal, a relationship between a noise component in the sound signal and a noise component in the vibration signal;

determining a noise component in the sound signal in signal segments including the user voice;

determining, based on the relationship and the noise component in the sound signal in the signal segments including the user voice, a noise component in the vibration the signal in signal segments including the user voice; and obtaining a target vibration signal by removing the noise component in the vibration signal in the signal segments including the user voice, wherein:

the at least one microphone includes a microphone array, the microphone array includes a plurality of microphones, and the determining, in the identified signal segments excluding the user voice within the sound signal and the vibration signal, the relationship between the noise component in the sound signal and the noise component in the vibration signal includes:

determining a first noise signal from the sound signal based on a relative positional relationship between the plurality of microphones in the microphone array in the identified signal segments excluding the user voice within the sound signal and the vibration signal, respectively, wherein the first noise signal is a noise signal synthesized from noises in all directions except a direction of the user voice in the environment; and determining a relationship between the first noise signal and the vibration signal.

12. The method of claim 11, including:

performing a noise reduction processing on the sound signal in one of the signal segments including the user voice of the sound signal; and aliasing at least part of components in the target vibration signal with at least part of components in the target sound signal, wherein frequencies of the at least part of the components in the target vibration signal are less than frequencies of the at least part of the components in the target sound signal.

13. The method of claim 11, including:

determining a first voice signal from the sound signal based on the relative positional relationship between the plurality of microphones in the microphone array in one of the signal segments including the user voice; and obtaining a target sound signal by performing, based on the first noise signal and the first voice signal, a noise reduction processing on the sound signal, or designate the first voice signal as the target sound signal.

14. The method of claim 11, further including:

obtaining a microphone signal collected by at least one target microphone in the plurality of microphones; and generating the sound signal by mixing the first noise signal and the microphone signal.

15. A non-transitory computer readable medium, comprising at least one set of instructions, wherein when read by a computing device, the at least one set of instructions causes the computing device to perform a method, the method comprising:

collecting a sound signal by at least one microphone, the sound signal including at least one of user voice and environmental noise;

collecting a vibration signal by at least one vibration sensor, the vibration signal including at least one of the user voice and the environmental noise;

identifying signal segments excluding the user voice within the sound signal and the vibration signal, respectively;

determining, in the identified signal segments excluding the user voice within the sound signal and the vibration signal, a relationship between a noise component in the sound signal and a noise component in the vibration signal;

determining a noise component in the sound signal in signal segments including the user voice;

determining, based on the relationship and the noise component in the sound signal in the signal segments including the user voice, a noise component in the vibration signal in the signal segments including the user voice; and obtaining a target vibration signal by removing the noise component in the vibration signal in the signal segments including the user voice, wherein:

the at least one microphone includes a microphone array, the microphone array includes a plurality of microphones, and the determining, in the identified signal segments excluding the user voice within the sound signal and the vibration signal, the relationship between the noise component in the sound signal and the noise component in the vibration signal includes:

determining a first noise signal from the sound signal based on a relative positional relationship between the plurality of microphones in the microphone array in the identified signal segments excluding the user voice within the sound signal and the vibration signal, respectively, wherein the first noise signal is a noise signal synthesized from noises in all directions except a direction of the user voice in the environment; and determining a relationship between the first noise signal and the vibration signal.

* * * * *